US012658745B2

(12) United States Patent
Zhang

(10) Patent No.: US 12,658,745 B2
(45) Date of Patent: Jun. 16, 2026

(54) STATOR ASSEMBLY, MOTOR AND VEHICLE

(71) Applicant: XIAOMI EV TECHNOLOGY CO., LTD., Beijing (CN)

(72) Inventor: Fei Zhang, Beijing (CN)

(73) Assignee: XIAOMI EV TECHNOLOGY CO., LTD., Beijing (CN)

(*) Notice: Subject to any disclaimer, the term of this patent is extended or adjusted under 35 U.S.C. 154(b) by 290 days.

(21) Appl. No.: 18/372,886

(22) Filed: Sep. 26, 2023

(65) Prior Publication Data

US 2024/0283307 A1     Aug. 22, 2024

(30) Foreign Application Priority Data

Feb. 20, 2023    (CN) .......................... 202310139188.7

(51) Int. Cl.
*H02K 1/20*        (2006.01)
*H02K 5/20*        (2006.01)

(52) U.S. Cl.
CPC ................. *H02K 1/20* (2013.01); *H02K 5/20* (2013.01); *H02K 5/203* (2021.01)

(58) Field of Classification Search
CPC .................................... H02K 1/20; H02K 5/20
See application file for complete search history.

(56) References Cited

U.S. PATENT DOCUMENTS

| | | | | |
|---|---|---|---|---|
| 4,893,041 A | * | 1/1990 | Snider | H02K 3/325 |
| | | | | 310/43 |
| 5,826,323 A | * | 10/1998 | Walters | H02K 1/12 |
| | | | | 29/598 |
| 2022/0393526 A1 | * | 12/2022 | Jelinewski | H02K 1/20 |
| 2023/0369924 A1 | * | 11/2023 | Luo | H02K 1/20 |

FOREIGN PATENT DOCUMENTS

| | | | | |
|---|---|---|---|---|
| CN | 113381531 A | | 9/2021 | |
| CN | 115037070 A | * | 9/2022 | H02K 1/20 |
| DE | 102019216125 A1 | * | 4/2021 | H02K 1/20 |

OTHER PUBLICATIONS

Chinese Patent Application No. 202310139188.7, Office Action dated Aug. 14, 2023, 8 pages.
Chinese Patent Application No. 202310139188.7, English translation of Office Action dated Aug. 14, 2023, 15 pages.

* cited by examiner

*Primary Examiner* — Tulsidas C Patel
*Assistant Examiner* — Robert E Mates
(74) *Attorney, Agent, or Firm* — Cozen O'Connor

(57)        ABSTRACT
A stator assembly includes a stator core and a cooling oil ring. The stator core is provided with a plurality of cooling channels, the plurality of cooling channels is arranged at intervals in a circumferential direction of the stator core, and extends in an axial direction of the stator core. The cooling oil ring is arranged at an end of the stator core and is coaxial with the stator core. The cooling oil ring is provided with a plurality of oil inlet channels and a plurality of oil outlet channels, the plurality of the oil inlet channels and the plurality of the oil outlet channels are arranged alternately in the circumferential direction of the cooling oil ring, and the oil inlet channels and the oil outlet channels are communicated with the cooling channels.

19 Claims, 6 Drawing Sheets

FRONT ◄────► REAR

STATOR ASSEMBLY, MOTOR AND VEHICLE

CROSS-REFERENCE TO RELATED APPLICATIONS

The present application claims the benefit of priority to Chinese Application No. 202310139188.7, filed on Feb. 20, 2023, the contents of which are incorporated herein by reference in their entireties for all purposes.

BACKGROUND

With continuous development of new energy vehicles and increasing market demand for new energy vehicles with a higher driving performance, a motor of the new energy vehicles needs to be continuously improved in speed, torque density and power density while being reduced in size. Increasing the speed, torque density and power density of the motor also increases the heat generated by the motor. Therefore, heat dissipation and cooling structures of the motor are essential to providing reliable, stable and efficient running of the motor. Strategies for cooling the motor may include air cooling, water cooling and oil cooling.

SUMMARY

The disclosure relates to the field of vehicle technology, and particularly to a stator assembly, a motor and a vehicle.

A stator assembly according to embodiments of the disclosure includes: a stator core, and a cooling oil ring. The stator core has a plurality of cooling channels, the plurality of cooling channels is arranged at intervals in a circumferential direction of the stator core, and extends in an axial direction of the stator core. The cooling oil ring is arranged at an end of the stator core and is coaxial with the stator core. The cooling oil ring has a plurality of oil inlet channels and a plurality of oil outlet channels, the plurality of oil inlet channels and the plurality of oil outlet channels are arranged alternately in a circumferential direction of the cooling oil ring, and the plurality of oil inlet channels and the plurality of oil outlet channels are communicated with the plurality of cooling channels.

A motor according to embodiments of the disclosure includes: a motor casing and a stator assembly. The motor casing is provided with an oil inlet. The stator-assembly includes: a stator core, and a cooling oil ring. The stator core has a plurality of cooling channels, the plurality of cooling channels is arranged at intervals in a circumferential direction of the stator core, and extends in an axial direction of the stator core. The cooling oil ring is arranged at an end of the stator core and is coaxial with the stator core. The cooling oil ring has a plurality of oil inlet channels and a plurality of oil outlet channels, the plurality of oil inlet channels and the plurality of oil outlet channels are arranged alternately in a circumferential direction of the cooling oil ring, and the plurality of oil inlet channels and the plurality of oil outlet channels are communicated with the plurality of cooling channels. The stator assembly is arranged in the motor casing, and the oil inlet is communicated with the plurality of oil inlet channels.

A vehicle according to embodiments of the disclosure includes a stator assembly. The stator assembly includes: a stator core, and a cooling oil ring. The stator core has a plurality of cooling channels, the plurality of cooling channels is arranged at intervals in a circumferential direction of the stator core, and extends in an axial direction of the stator core. The cooling oil ring is arranged at an end of the stator core and is coaxial with the stator core. The cooling oil ring has a plurality of oil inlet channels and a plurality of oil outlet channels, the plurality of oil inlet channels and the plurality of oil outlet channels are arranged alternately in a circumferential direction of the cooling oil ring, and the plurality of oil inlet channels and the plurality of oil outlet channels are communicated with the plurality of cooling channels.

DETAILED DESCRIPTION

Figure 1:
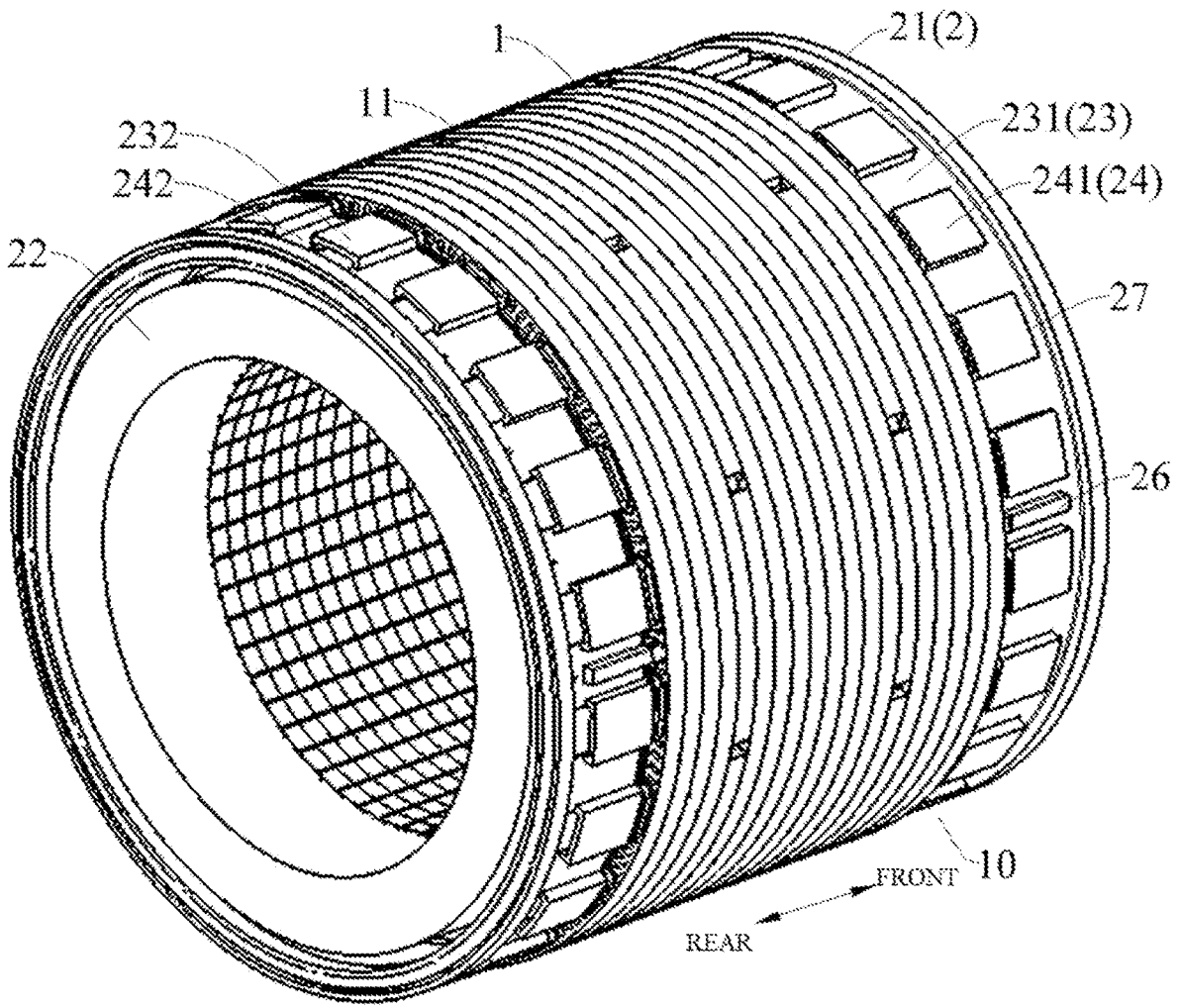
FIG. 1 is an axonometric view illustrating a stator assembly according to an embodiment of the disclosure.

Water cooling is mostly adopted in traditional motor cooling, and very few low-performance motors adopt economical air cooling. However, water cooling is indirect cooling, so that cooling water may not directly contact heat dissipation parts, and therefore has certain defects. However, oil cooling is becoming the first choice for a cooling scheme of a high-performance motor due to natural electrical insulation it provides, a high degree of freedom in structural design and other features.

In the related art, manufacturers usually provide an oil pipe or an oil collecting plate near a top of a stator and an end of a winding of the motor, the oil pipe or the oil collecting plate is provided with an oil injection hole, and cooling oil is injected from the oil injection hole to an outer side of a stator core and the end of the winding. However, after the oil is sprayed to the top of the stator core, the oil flows to bottom of the stator core along an outer surface of the stator core under action of gravity. The flowing oil may not cover a whole area of the outer surface of the stator core, the flowing speed is low, and windings at two ends of the stator core may not be sufficiently cooled. Therefore, a cooling structure of the motor in the related art is not designed reasonably, resulting in a poor heat dissipation effect of the motor.

Embodiments of the disclosure will be described in detail and examples of embodiments are illustrated in the drawings. The embodiments described herein with reference to drawings are explanatory, and used to generally understand the disclosure. The embodiments shall not be construed to limit the disclosure.

A stator assembly 10, a motor and a vehicle according to embodiments of the disclosure are described below with reference to FIGS. 1 to 11.

As illustrated in FIGS. 1 to 11, the stator assembly 10 according to embodiments of the disclosure includes a stator core 1 and a cooling oil ring 2. The stator core 1 is provided with a plurality of cooling channels 12, the plurality of cooling channels 12 is arranged at intervals in a circumferential direction of the stator core 1, and the cooling channels 12 extend in an axial direction (e.g., a front-rear direction of FIG. 2) of the stator core 1. The cooling oil ring 2 is arranged at an end of the stator core 1 and is coaxial with the stator core 1. The cooling oil ring 2 is provided with a plurality of oil inlet channels 23 and a plurality of oil outlet channels 24, the plurality of the oil inlet channels 23 and the plurality of the oil outlet channels 24 are arranged alternately in the circumferential direction of the cooling oil ring 2, and the oil inlet channel 23 and the oil outlet channels 24 are communicated with the cooling channels 12.

It may be understood that, as illustrated in FIGS. 1 to 5, the plurality of oil inlet channels 23 and the plurality of oil outlet channels 24 are arranged alternately in the circumferential direction of the cooling oil ring 2, that is, one oil outlet channel 24 is arranged between every two adjacent oil inlet channels 23, or one oil inlet channel 23 is arranged between every two adjacent oil outlet channels 24. One oil inlet channel 23 or one oil outlet channel 24 may correspond in position to one or more cooling channels 12. In other words, an opening of the cooling channel 12 is located on an end face of the stator core 1, and an opening of the oil inlet channel 23 and an opening of the oil outlet channel 24 may be opposite to one or more cooling channels 12 after the cooling oil ring 2 is mounted on the end of the stator core 1.

In the stator assembly 10 according to embodiments of the disclosure, the plurality of oil inlet channels 23 and the plurality of oil outlet channels 24 are arranged alternately in the circumferential direction of the cooling oil ring 2, and the oil inlet channels 23, the oil outlet channels 24 and the cooling channels 12 are communicated to form a circulating cooling loop, so that an outer circumferential wall of the stator core 1 may be sufficiently and uniformly cooled. On the other hand, since the cooling oil ring 2 is arranged at the end of the stator core 1, the end of the stator core 1 and the end of a winding 3 may be conveniently cooled, and uniformity during cooling is better. Therefore, the stator assembly 10 of embodiments of the disclosure has a reasonable structural design, so that the stator core 1 and the winding 3 may be sufficiently and uniformly cooled, and the heat dissipation effect of the stator core 1 is improved.

Figure 2:
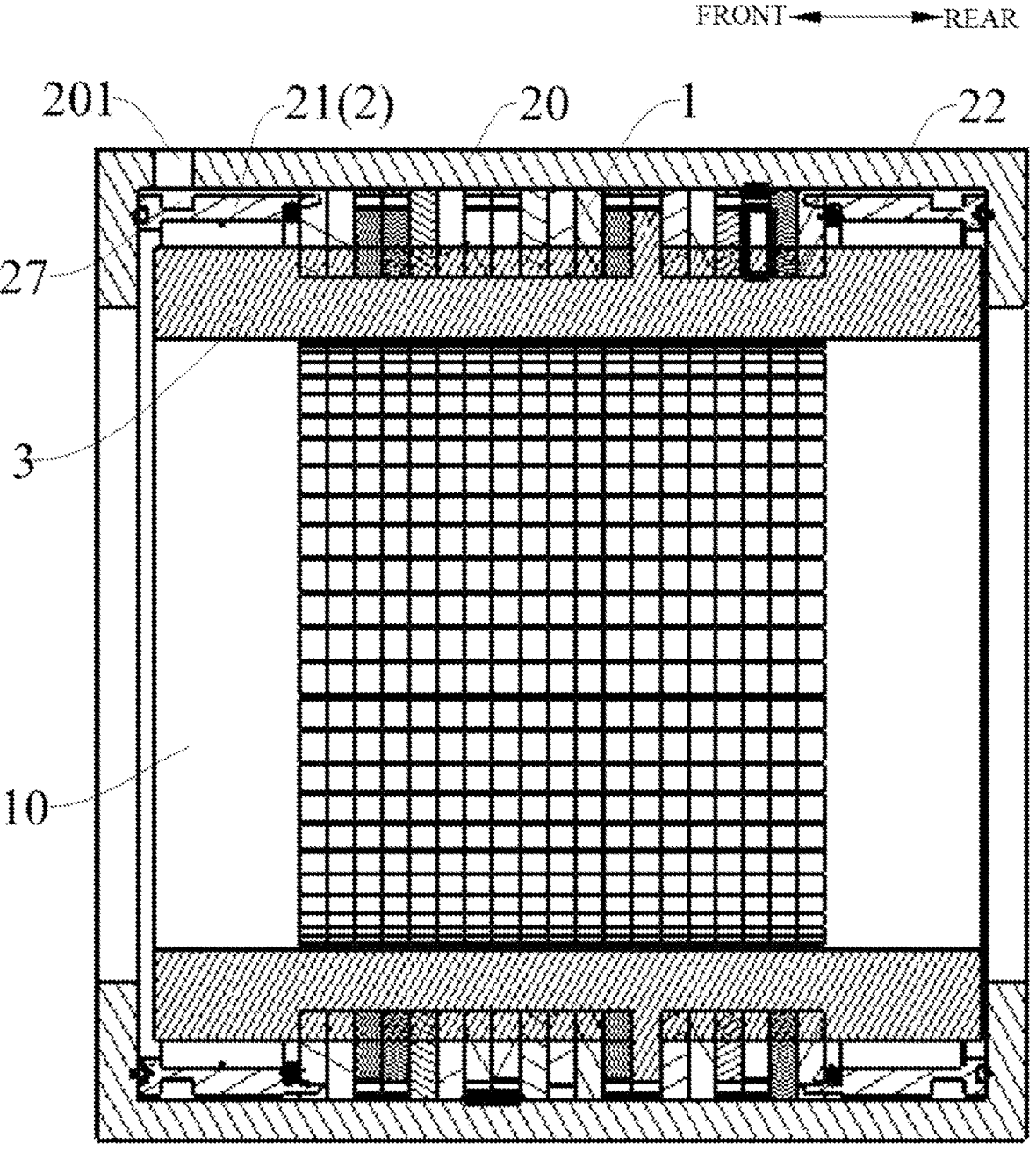
FIG. 2 is a cross-sectional view illustrating a motor according to an embodiment of the disclosure.

Specifically, as illustrated in FIG. 2, the stator assembly 10 further includes the winding 3, the winding 3 is arranged on the stator core 1, an end of the winding 3 protrudes from the stator core 1 in the axial direction of the stator core 1, and the cooling oil ring 2 is fitted over the end of the winding 3, so that the stator assembly 10 of embodiments of the disclosure may uniformly cool the ends of the stator core 1 and the winding 3 at the same time, further improving the heat dissipation effect of the stator assembly 10.

In some embodiments, as illustrated in FIGS. 1 to 4, the cooling oil ring 2 may be arranged at an end of the stator core 1 (such as a front or rear end of the stator core 1 in FIG. 2), or the cooling oil ring 2 may be arranged at both ends of the stator core 1. In embodiments of the disclosure, the cooling oil ring 2 includes a first oil ring 21 and a second oil ring 22, and the first oil ring 21 and the second oil ring 22 are respectively arranged at both ends of the stator core 1 in the axial direction. The first oil ring 21 is provided with a plurality of first oil inlet channels 231 and a plurality of first oil outlet channels 241, and the second oil ring 22 is provided with a plurality of second oil inlet channels 232 and a plurality of second oil outlet channels 242. It may be understood that the plurality of first oil inlet channels 231 and the plurality of first oil outlet channels 241 are alternately arranged in a circumferential direction of the first oil ring 21, and the plurality of second oil inlet channels 232 and the plurality of second oil outlet channels 242 are alternately arranged in a circumferential direction of the second oil ring 22.

Figure 3:
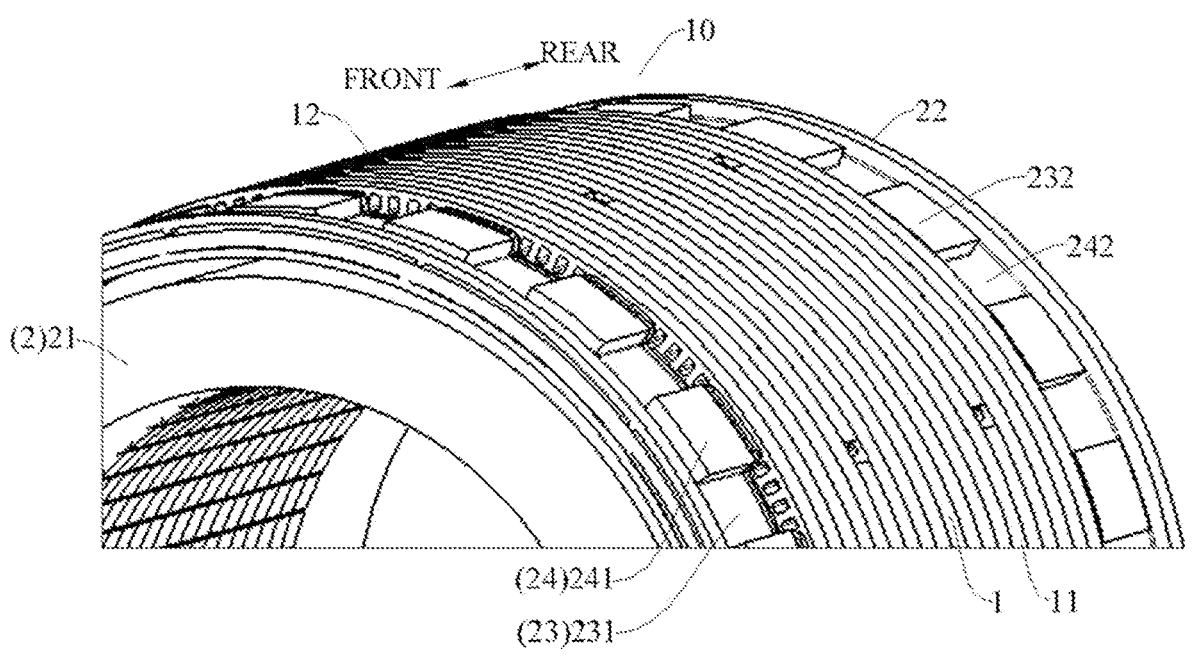
FIG. 3 is a partial schematic diagram illustrating a stator assembly according to an embodiment of the disclosure.
Figure 4:
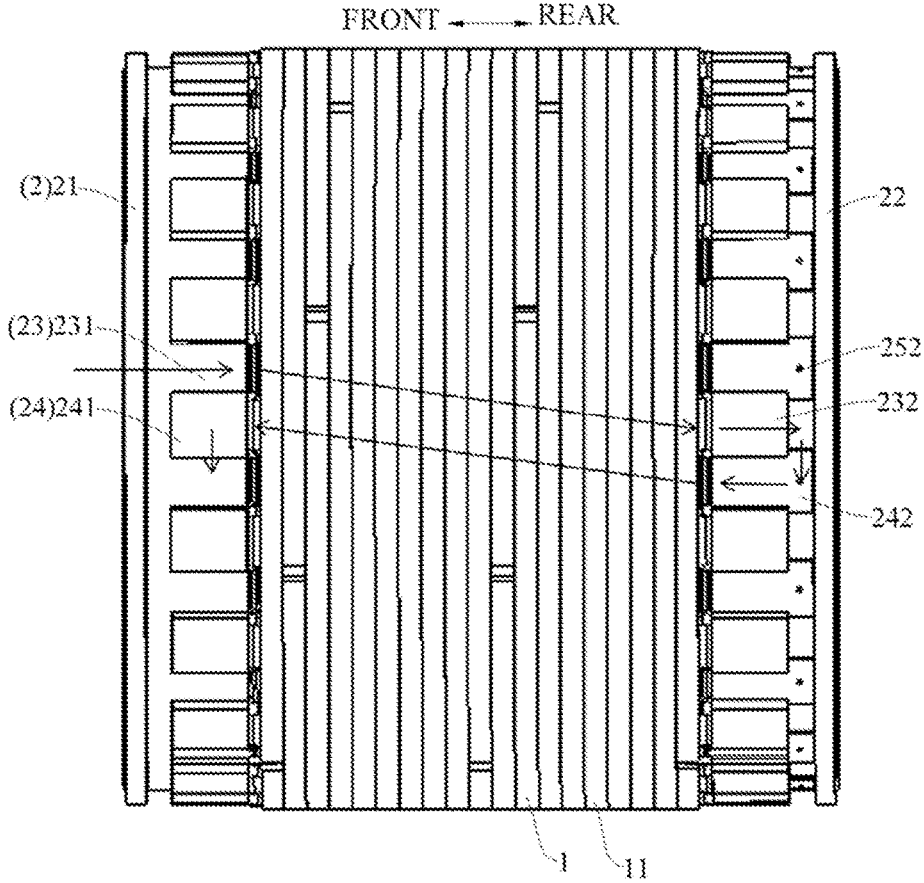
FIG. 4 is a side view illustrating a stator assembly according to an embodiment of the disclosure.
Figure 5:
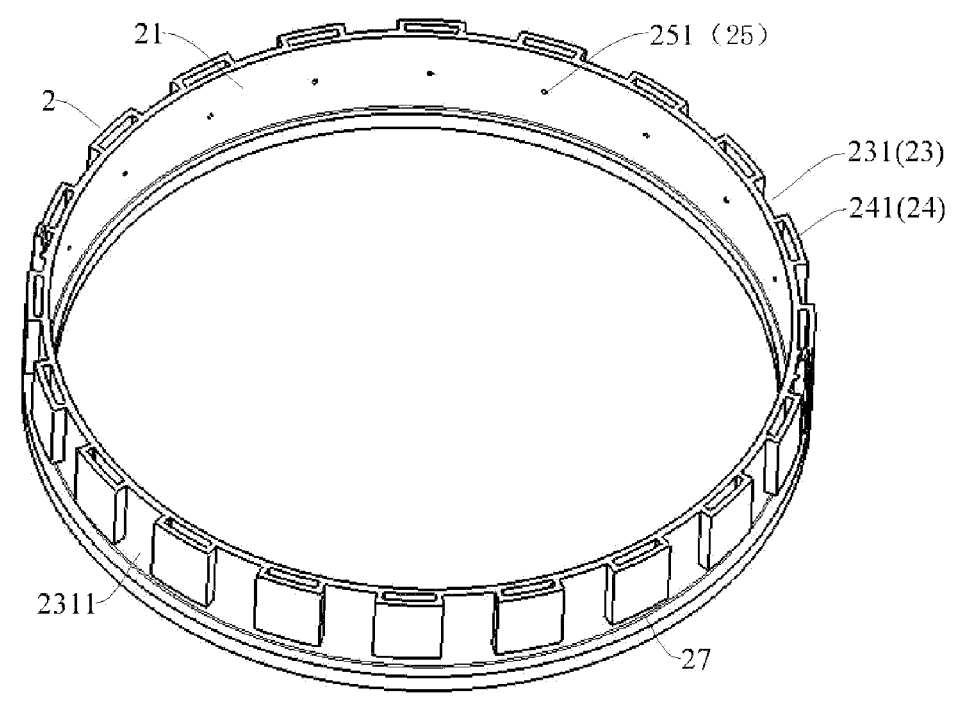
FIG. 5 is a schematic diagram illustrating a first oil ring of a stator assembly according to an embodiment of the disclosure.

As illustrated in FIGS. 3 to 5, the first oil inlet channels 231 are communicated with the second oil inlet channels 232 through the corresponding cooling channels 12, the second oil inlet channels 232 are communicated with the second oil outlet channels 242, and the second oil outlet channels 242 are communicated with the first oil outlet channels 241 through the corresponding cooling channels 12. For example, the first oil ring 21 is arranged at the front end of the stator core 1, and the second oil ring 22 is arranged at the rear end of the stator core 1. Cooling oil may be introduced into the cooling channel 12 through the first oil inlet channel 231 of the first oil ring 21, then the cooling oil moves in a length direction of the cooling channel 12 and flows out from the other end of the cooling channel 12, and the outflowing cooling oil may enter the second oil inlet channel 232 of the second oil ring 22. Since the second oil inlet channel 232 is communicated with an adjacent second oil outlet channel 242, the cooling oil may be discharged to the second oil ring 22 through the second oil outlet channel 242, and finally the cooling oil may be returned to the first oil outlet channel 241 through another cooling channel 12. Therefore, the cooling oil flows in the first oil ring 21, the stator core 1 and the second oil ring 22, so that a side wall and two ends of the stator core 1, as well as the two ends of the winding 3, may be fully and uniformly cooled, thereby further improving the heat dissipation effect of the stator assembly 10.

In some examples, a cross-sectional area of the oil inlet channels 23 orthogonal to the axial direction of the stator core 1 is equal to a cross-sectional area of the oil outlet channels 24 orthogonal to the axial direction of the stator core 1, so that flow velocity consistency of the cooling oil in the oil inlet channel 23 and the oil outlet channel 24 is better, and the uniformity of cooling of the stator assembly 10 is improved.

In some embodiments, as illustrated in FIG. 5, an inner circumferential wall of the first oil ring 21 is provided with a first oil injection hole 251, and the first oil injection hole 251 is communicated with the first oil outlet channel 241. It may be understood that the cooling oil may be injected into the front end of the winding 3 through the first oil injection hole 251, thereby cooling the winding 3 and improving the heat dissipation effect of the winding 3.

Figures 7, 8:
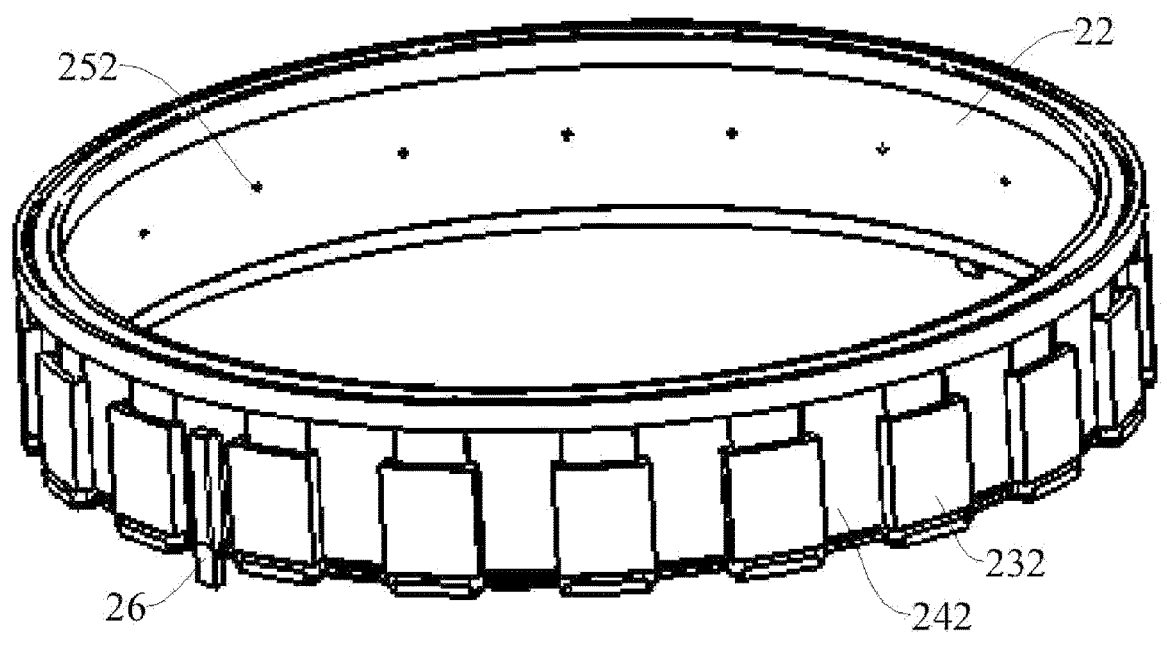
FIG. 7 is a schematic diagram illustrating a second oil ring of a stator assembly according to another embodiment of the disclosure.
FIG. 8 is a schematic diagram illustrating a second oil ring of a stator assembly according to still another embodiment of the disclosure.

In some examples, as illustrated in FIGS. 7 and 8, an inner circumferential wall of the second oil ring 22 is provided with a second oil injection hole 252, and the second oil injection hole 252 is communicated with the second oil outlet channel 242. It may be understood that the cooling oil may be injected into the rear end of the winding 3 through the second oil injection hole 252, thereby cooling the winding 3 and improving the heat dissipation effect of the winding 3.

Figure 10:
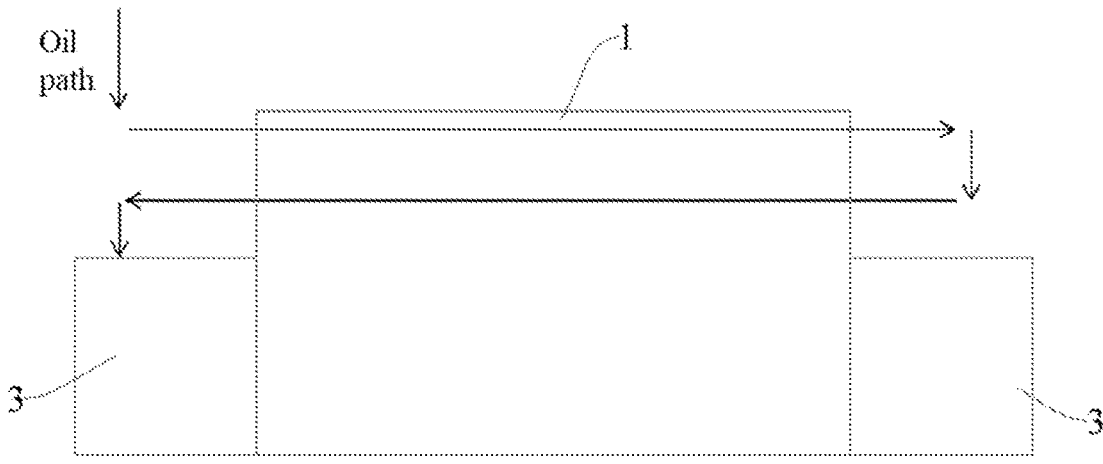
FIG. 10 is a schematic diagram illustrating a cooling process of a stator assembly according to an embodiment of the disclosure.

In a specific embodiment, as illustrated in FIGS. 3 and 10, the inner circumferential wall of the first oil ring 21 is provided with the first oil injection hole 251, and the second oil ring 22 is not provided with the second oil injection hole 252. The cooling oil may be introduced into the cooling channel 12 through the first oil inlet channel 231 of the first oil ring 21 when the stator assembly 10 is cooled, and then the cooling oil moves in the length direction of the cooling channel 12 and flows out from the other end of the cooling channels 12. The outflowing cooling oil may enter the second oil inlet channel 232 of the second oil ring 22 and be discharged to the second oil ring 22 through the second oil outlet channel 242, and then the cooling oil returns to the first oil outlet channel 241 through another cooling channel 12. Since the inner circumferential wall of the first oil ring 21 is provided with the first oil injection hole 251, the cooling oil may be sprayed on the winding 3 to further dissipate heat on the winding 3.

Figure 11:
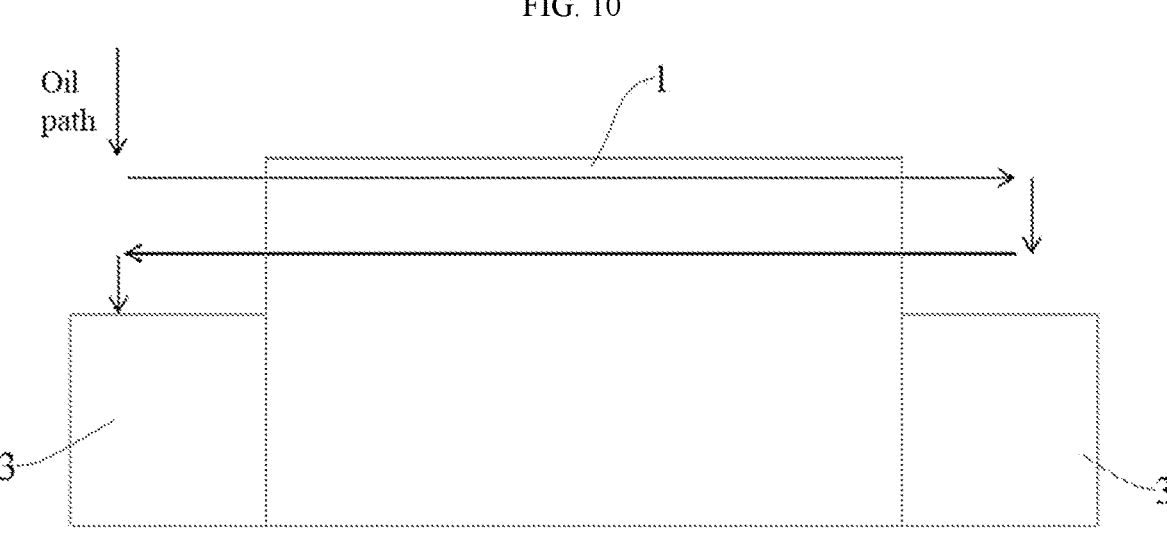
FIG. 11 is a schematic diagram illustrating a cooling process of a stator assembly according to another embodiment of the disclosure.

In another specific embodiment, as illustrated in FIGS. 3 and 11, the inner circumferential wall of the first oil ring 21 is provided with the first oil injection hole 251 and the second oil ring 22 is provided with the second oil injection hole 252. The cooling oil may be introduced into the cooling channel 12 through the first oil inlet channel 231 of the first oil ring 21 when the stator assembly 10 is cooled, and then the cooling oil moves in the length direction of the cooling channel 12 and flows out from the other end of the cooling channel 12, and the outflowing cooling oil may enter the second oil inlet channel 232 of the second oil ring 22. Since the second oil ring 22 is provided with the second oil injection hole 252, part of the cooling oil is injected from the second oil injection hole 252 to dissipate the heat at the rear end of the winding 3. Another part of the cooling oil is discharged to the second oil ring 22 through the second oil outlet channel 242, and then the cooling oil returns to the first oil outlet channel 241 through another cooling channel 12. Since the inner circumferential wall of the first oil ring 21 is provided with the first oil injection hole 251, the cooling oil may be sprayed on the winding 3 to further dissipate the heat at the front end of the winding 3.

In some examples, as illustrated in FIG. 5, the inner wall of the cooling oil ring 2 is provided with a plurality of oil injection holes 25, the plurality of oil injection holes 25 is arranged at intervals in the circumferential direction of the cooling oil ring 2, and the plurality of oil injection holes 25 is in one-to-one correspondence with and in communication with plurality of oil outlet channels 24. Specifically, a plurality of first oil injection holes 251 is provided, and the plurality of first oil injection holes 251 is arranged at intervals in the circumferential direction of the first oil ring 21. For example, the plurality of first oil injection holes 251 is in one-to-one correspondence with the plurality of first oil inlet channels 231, thereby improving the uniformity of cooling the front end of the winding 3. A plurality of second oil injection holes 252 is provided, and the plurality of second oil injection holes 252 is arranged at intervals in the circumferential direction of the second oil ring 22. For example, the plurality of second oil injection holes 252 is in one-to-one correspondence with the plurality of second oil inlet channels 232, thereby improving the uniformity of cooling the rear end of the winding 3.

In some examples, a length direction of the cooling channel 12 is arranged in parallel with the axial direction of the stator core 1, so that the stator core 1 is convenient to process and manufacture, and the structure is simple and the cost is low.

In some examples, as illustrated in FIG. 4, the cooling channel 12 is spirally surrounded the stator core 1. It may be understood that there is a certain included angle between the cooling channel 12 and the axial direction of the stator core 1, so that a path of the cooling channel 12 in the stator core 1 may be lengthened, and cooling effect of the stator core 1 is better.

Figure 9:
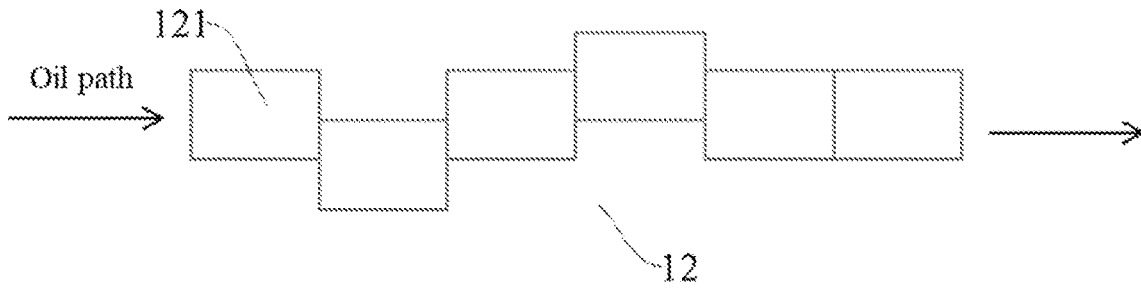
FIG. 9 is a schematic diagram illustrating a cooling channel of a stator core of a stator assembly according to an embodiment of the disclosure.

In some examples, as illustrated in FIG. 9, the cooling channel 12 is arranged on the stator core 1 in a meandering manner. For example, a shape of the cooling channel 12 may be wavy or serpentine, so that the path of the cooling channels 12 in the stator core 1 may be lengthened, and the cooling effect of the stator core 1 is better.

In some embodiments, as illustrated in FIG. 4, the stator core 1 includes a plurality of core punching sheets 11, and the plurality of core punching sheets 11 is laminated to form the stator core 1, the core punching sheet 11 is provided with a through hole 121, and the through holes 121 of the plurality of core punching sheets 11 are connected in series to each other to form the cooling channel 12. It may be understood that, as illustrated in FIG. 9, adjacent core punching sheets 11 may be staggered by a certain angle in the circumferential direction, so that the cooling channel 12 formed by connecting the plurality of through holes 121 in series may have different flow paths, thereby facilitating processing and manufacturing of the cooling channel 12, and the manufacturing process is simple and the cost is low. In addition, the stator assembly 10 of embodiments of the disclosure may avoid machining equivalent oil channels on a surface of a motor casing 20 by configuring the cooling channels 12 as the above-described structure, thereby saving manufacturing cost of the motor.

For example, the plurality of core punching sheets 11 may be reliably connected to each other by welding, riveting or bonding. Each core punching sheet 11 is staggered in the circumferential direction based on a certain rule to form a spiral cooling channel 12, thereby further increasing a heat dissipation area of the cooling channel 12 and improving heat dissipation efficiency.

In some embodiments, as illustrated in FIGS. 7 and 8, the cooling oil ring 2 is provided with an insertion post 26, and the end of the stator core 1 is provided with a matching hole (not illustrated), and the insertion post 26 is inserted into the matching hole, so that installation of the cooling oil ring 2 and the stator core 1 may be facilitated, and structural design is simple and connection reliability is high. For example, there may be a plurality of insertion posts 26, the plurality of insertion posts 26 is arranged at intervals in the circumferential direction of the cooling oil ring 2, and correspondingly, there is a plurality of mating holes, the plurality of mating holes is arranged at intervals in the circumferential direction of the stator core 1 and in one-to-one correspondence with the insertion posts 26.

In some examples, the first oil ring 21 and the second oil ring 22 may be made of oil-resistant and high-temperature resistant plastic. For example, the first oil ring 21 and the second oil ring 22 may be made of PA66, PPA or PPS.

As illustrated in FIG. 2, the motor according to other embodiments of the disclosure includes the motor casing 20 and the stator assembly 10. The motor casing 20 is provided with an oil inlet 201, and the stator assembly 10 is the stator assembly 10 of the disclosure. The stator assembly 10 is arranged in the motor casing 20, and the oil inlet 201 is communicated with oil inlet channel 23.

In the motor according to embodiments of the disclosure, the plurality of oil inlet channels 23 and the plurality of oil outlet channels 24 are arranged alternately in the circumferential direction of the cooling oil ring 2, and the oil inlet channels 23, the oil outlet channels 24 and the cooling channels 12 are communicated to form the circulating cooling loop, so that the outer circumferential wall of the stator core 1 may be sufficiently and uniformly cooled. On the other hand, since the cooling oil ring 2 is arranged at the end of the stator core 1, the end of the stator core 1 and the end of the winding 3 may be conveniently cooled, and the uniformity during the cooling is better. Therefore, the stator assembly 10 of embodiments of the disclosure has the reasonable structural design, so that the stator core 1 and the winding 3 may be sufficiently and uniformly cooled, and the heat dissipation effect of the motor is improved.

In some embodiments, as illustrated in FIG. 5, the outer circumferential wall of the cooling oil ring 2 is provided with an annular groove 27, the annular groove 27 is located on a side of the cooling oil ring 2 facing away from the stator core 1, the annular groove 27 is communicated with the plurality of oil inlet channels, and the oil inlet 201 is communicated with the annular groove 27. It may be understood that the cooling oil may enter the annular groove 27 through the oil inlet 201. Since the annular groove 27 is communicated with the plurality of oil inlet channels 23, the cooling oil may be evenly distributed into each cooling channel 12 of the stator core 1, so that the end of the winding 3 and the stator core 1 may be sufficiently and uniformly cooled.

In some examples, as illustrated in FIGS. 2 and 5, the outer circumferential wall of the cooling oil ring 2 is provided with a first groove 2311, and the first groove 2311 and the inner wall of the motor casing 20 define the oil inlet channel 23. For example, the first oil ring 21 is provided with the first groove 2311, and a circumferential wall of the first groove 2311 and the inner wall of the motor casing 20 define the first oil inlet channel 231, and the first oil ring 21 is axially perforated to form the first oil outlet channel 241. In the stator assembly 10 of embodiments of the disclosure, the first oil ring 21 is configured as the above-described structure, so that the processing and manufacturing of the first oil ring 21 may be facilitated, and the manufacturing cost is low.

Figure 6:
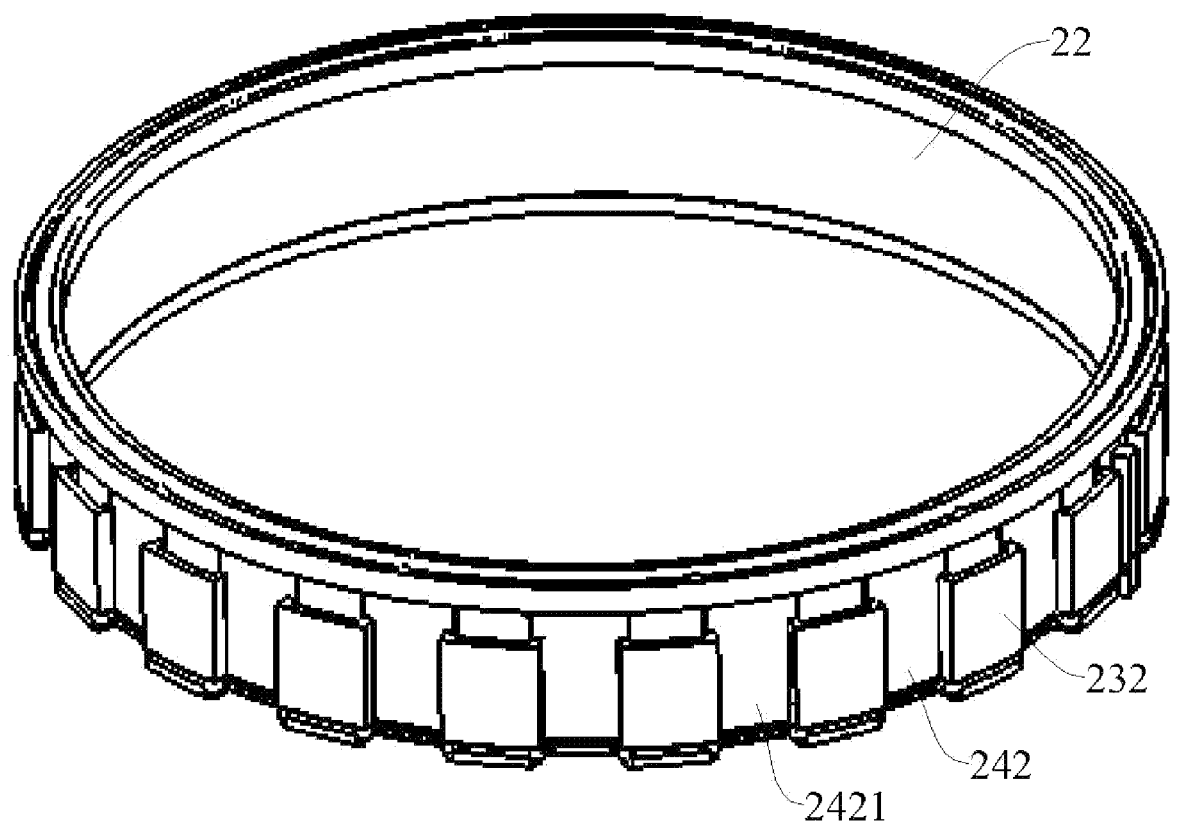
FIG. 6 is a schematic diagram illustrating a second oil ring of a stator assembly according to an embodiment of the disclosure.

In some examples, as illustrated in FIGS. 2 and 6, the outer circumferential wall of the cooling oil ring 2 is provided with a second groove 2421, and the second groove 2421 and the inner wall of the motor casing 20 define the oil outlet channel 24. For example, the second oil ring 22 is provided with the second groove 2421, and the circumferential wall of the second groove 2421 and the inner wall of the motor casing 20 define the second oil outlet channel 242, and the second oil ring 22 is axially perforated to form the second oil inlet channel 232. In the stator assembly 10 of embodiments of the disclosure, the second oil ring 22 is configured as the above-described structure, so that the processing and manufacturing of the second oil ring 22 may be facilitated, and the manufacturing cost is low.

A vehicle according to other embodiments of the disclosure includes the stator assembly 10 or the motor of embodiments of the disclosure.

In the vehicle according to embodiments of the disclosure, the plurality of oil inlet channels 23 and the plurality of oil outlet channels 24 are arranged alternately in the circumferential direction of the cooling oil ring 2 in the motor, and the oil inlet channels 23, the oil outlet channels 24 and the cooling channels 12 are communicated to form the circulating cooling loop, so that the outer circumferential wall of the stator core 1 may be sufficiently and uniformly cooled. On the other hand, since the cooling oil ring 2 is arranged at the end of the stator core 1, the end of the stator core 1 and the end of the winding 3 may be conveniently cooled, and the uniformity during the cooling is better. Therefore, the motor of the vehicle of embodiments of the disclosure has a reasonable structural design, so that the stator core 1 and the winding 3 may be sufficiently and uniformly cooled, and the heat dissipation effect of the stator core is improved.

The stator assembly of embodiments of the disclosure includes: a stator core, and a cooling oil ring. The stator core is provided with a plurality of cooling channels, the plurality of cooling channels is arranged at intervals in a circumferential direction of the stator core, and extends in an axial direction of the stator core. The cooling oil ring is arranged at an end of the stator core and is coaxial with the stator core. The cooling oil ring is provided with a plurality of oil inlet channels and a plurality of oil outlet channels, the plurality of oil inlet channels and the plurality of oil outlet channels are arranged alternately in a circumferential direction of the cooling oil ring, and the oil inlet channels and the oil outlet channels are communicated with the cooling channels.

In some embodiments, the cooling oil ring includes a first oil ring and a second oil ring, the first oil ring and the second oil ring are respectively arranged at two ends of the stator core in the axial direction, the first oil ring is provided with a plurality of first oil inlet channels and a plurality of first oil outlet channels, and the second oil ring is provided with a plurality of second oil inlet channels and a plurality of second oil outlet channels, and the first oil inlet channels are communicated with the second oil inlet channels through the corresponding cooling channels, the second oil inlet channels are communicated with the second oil outlet channels, and the second oil outlet channels are communicated with the first oil outlet channels through the corresponding cooling channels.

In some embodiments, an inner circumferential wall of the first oil ring is provided with a first oil injection hole, and the first oil injection hole is communicated with the first oil outlet channels; and/or an inner circumferential wall of the second oil ring is provided with a second oil injection hole, and the second oil injection hole is communicated with the second oil outlet channels.

In some embodiments, an inner wall of the cooling oil ring is provided with a plurality of oil injection holes, the plurality of oil injection holes is arranged at intervals in the circumferential direction of the cooling oil ring, and the plurality of oil injection holes is in one-to-one correspondence with and in communication with the plurality of oil outlet channels.

In some embodiments, a length direction of the cooling channels is arranged in parallel with the axial direction of the stator core; or the cooling channels are spirally surrounded the stator core; or the cooling channels are arranged on the stator core in a meandering manner.

In some embodiments, the stator core includes a plurality of core punching sheets, and the plurality of the core punching sheets is laminated to form the stator core, the core punching sheets are provided with through holes, and the through holes of the plurality of the core punching sheets are connected in series to each other to form the cooling channels.

In some embodiments, the cooling oil ring is provided with an insertion post, an end of the stator core is provided with a mating hole, and the insertion post is inserted into the mating hole.

In some embodiments, the stator assembly further includes a winding arranged on the stator core, an end of the winding is protruded from the stator core in the axial direction of the stator core, and the cooling oil ring is fitted over the end of the winding.

In some embodiments, a cross-sectional area of the oil inlet channels orthogonal to the axial direction of the stator core is equal to a cross-sectional area of the oil outlet channels orthogonal to the axial direction of the stator core.

A motor according to other embodiments of the disclosure includes: a motor casing and a stator assembly. The motor casing is provided with an oil inlet. The stator assembly is the stator assembly described in any one of embodiments of the disclosure. The stator assembly is arranged in the motor casing, and the oil inlet is communicated with the oil inlet channels.

In some embodiments, an outer circumferential wall of the cooling oil ring is provided with an annular groove, the annular groove is located on a side of the cooling oil ring facing away from the stator core, the annular groove is communicated with the plurality of oil inlet channels, and the oil inlet is communicated with the annular groove.

In some embodiments, an outer circumferential wall of the cooling oil ring is provided with a first groove, and the first groove and an inner wall of the motor casing define the oil inlet channels, or the outer circumferential wall of the cooling oil ring is provided with a second groove, and the second groove and the inner wall of the motor casing define the oil outlet channels.

A vehicle according to other embodiments of the disclosure includes the stator assembly or the motor of embodiments of the disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as illustrated in the drawings under discussion. These relative terms are for convenience of description and do not require that the disclosure be constructed or operated in a particular orientation.

In addition, terms such as "first" and "second" are used herein for purposes of description and are not intended to indicate or imply relative importance or significance. Thus, the feature defined with "first" and "second" may comprise one or more this feature. In the description of the disclosure, "a plurality of" means at least two, for example, two or three, unless specified otherwise.

In the disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the disclosure.

In the disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although explanatory embodiments have been illustrated and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A stator assembly, comprising:
   a stator core having a plurality of cooling channels, the plurality of cooling channels being arranged at intervals in a circumferential direction of the stator core and extending in an axial direction of the stator core; and
   a cooling oil ring arranged at an end of the stator core and coaxial with the stator core, the cooling oil ring having a plurality of oil inlet channels and a plurality of oil outlet channels, the plurality of the oil inlet channels and the plurality of the oil outlet channels being arranged alternately in a circumferential direction of the cooling oil ring, and the plurality of oil inlet channels and the plurality of oil outlet channels being communicated with the plurality of cooling channels;
   wherein the cooling oil ring comprises a first oil ring and a second oil ring, the first oil ring and the second oil ring are respectively provided at two ends of the stator core in the axial direction, the first oil ring has a plurality of first oil inlet channels and a plurality of first oil outlet channels, and the second oil ring has a plurality of second oil inlet channels and a plurality of second oil outlet channels, and
   the plurality of first oil inlet channels are communicated with the plurality of second oil inlet channels through corresponding cooling channels, the plurality of second oil inlet channels are communicated with the plurality of second oil outlet channels, and the plurality of second oil outlet channels are communicated with the plurality of first oil outlet channels through corresponding cooling channels.

2. The stator assembly of claim 1, wherein an inner circumferential wall of the first oil ring has a first oil injection hole, and the first oil injection hole is communicated with the first oil outlet channel.

3. The stator assembly of claim 1, wherein an inner circumferential wall of the second oil ring has a second oil injection hole, and the second oil injection hole is communicated with the second oil outlet channel.

4. The stator assembly of claim 1, wherein an inner wall of the cooling oil ring has a plurality of oil injection holes, the plurality of oil injection holes are arranged at intervals in the circumferential direction of the cooling oil ring, and the plurality of oil injection holes is in one-to-one correspondence with and in communication with the plurality of oil outlet channels.

5. The stator assembly of claim 1, wherein a length direction of each of the plurality of cooling channels is arranged in parallel with the axial direction of the stator core.

6. The stator assembly of claim 1, wherein each of the plurality of cooling channels is spirally surrounded the stator core.

7. The stator assembly of claim 1, wherein each of the plurality of cooling channels is arranged on the stator core in a meandering manner.

8. The stator assembly of claim 1, wherein the stator core comprises a plurality of core punching sheets, the plurality of the core punching sheets is laminated to form the stator core, each of the plurality of core punching sheets has a through hole, and the through holes of the plurality of the core punching sheets are connected in series to each other to form the cooling channel.

9. The stator assembly of claim 1, wherein the cooling oil ring is provided with an insertion post, an end of the stator core has a mating hole, and the insertion post is inserted into the mating hole.

10. The stator assembly of claim 1, further comprising a winding arranged on the stator core, wherein an end of the winding is protruded from the stator core in the axial direction of the stator core, and the cooling oil ring is fitted over on the end of the winding.

11. The stator assembly of claim 1, wherein a cross-sectional area of each of the plurality of oil inlet channels orthogonal to the axial direction of the stator core is equal to a cross-sectional area of each of the plurality of oil outlet channels orthogonal to the axial direction of the stator core.

12. The stator assembly of claim 1, wherein each oil outlet channel is arranged between every two adjacent oil inlet channels.

13. The stator assembly of claim 1, wherein each oil inlet channel or each oil outlet channel correspond in position to one or more cooling channels.

14. The stator assembly of claim 1, wherein an opening of each cooling channel is located on an end face of the stator core, and an opening of each oil inlet channel and an opening of each oil outlet channel are opposite to one or more cooling channels.

15. A motor, comprising:
a motor casing having an oil inlet; and
a stator assembly arranged in the motor casing and comprising:
a stator core having a plurality of cooling channels, the plurality of cooling channels being arranged at intervals in a circumferential direction of the stator core and extending in an axial direction of the stator core, and a cooling oil ring arranged at an end of the stator core and coaxial with the stator core, the cooling oil ring having a plurality of oil inlet channels and a plurality of oil outlet channels, the plurality of the oil inlet channels and the plurality of the oil outlet channels being arranged alternately in a circumferential direction of the cooling oil ring, and the plurality of oil inlet channels and the plurality of oil outlet channels being communicated with the plurality of cooling channels,
wherein the oil inlet is communicated with the plurality of oil inlet channels;
wherein the cooling oil ring comprises a first oil ring and a second oil ring, the first oil ring and the second oil ring are respectively provided at two ends of the stator core in the axial direction, the first oil ring has a plurality of first oil inlet channels and a plurality of first oil outlet channels, and the second oil ring has a plurality of second oil inlet channels and a plurality of second oil outlet channels, and
the plurality of first oil inlet channels are communicated with the plurality of second oil inlet channels through corresponding cooling channels, the plurality of second oil inlet channels are communicated with the plurality of second oil outlet channels, and the plurality of second oil outlet channels are communicated with the plurality of first oil outlet channels through corresponding cooling channels.

16. The motor of claim 15, wherein an outer circumferential wall of the cooling oil ring has an annular groove, the annular groove is located on a side of the cooling oil ring facing away from the stator core, the annular groove is communicated with the plurality of oil inlet channels, and the oil inlet is communicated with the annular groove.

17. The motor of claim 15, wherein an outer circumferential wall of the cooling oil ring has a first groove, and the first groove and an inner wall of the motor casing define the oil inlet channel.

18. The motor of claim 15, wherein an outer circumferential wall of the cooling oil ring has a second groove, and the second groove and an inner wall of the motor casing define the oil outlet channel.

19. A vehicle, comprising:
a stator assembly comprising:
a stator core having a plurality of cooling channels, the plurality of cooling channels being arranged at intervals in a circumferential direction of the stator core and extending in an axial direction of the stator core, and
a cooling oil ring arranged at an end of the stator core and coaxial with the stator core, the cooling oil ring having a plurality of oil inlet channels and a plurality of oil outlet channels, the plurality of the oil inlet channels and the plurality of the oil outlet channels being arranged alternately in a circumferential direction of the cooling oil ring, and the plurality of oil inlet channels and the plurality of oil outlet channels being communicated with the plurality of cooling channels;
wherein the cooling oil ring comprises a first oil ring and a second oil ring, the first oil ring and the second oil ring are respectively provided at two ends of the stator core in the axial direction, the first oil ring has a plurality of first oil inlet channels and a plurality of first oil outlet channels, and the second oil ring has a plurality of second oil inlet channels and a plurality of second oil outlet channels, and the plurality of first oil inlet channels are communicated with the plurality of second oil inlet channels through corresponding cooling channels, the plurality of second oil inlet channels are communicated with the plurality of second oil outlet channels, and the plurality of second oil outlet channels are communicated with the plurality of first oil outlet channels through corresponding cooling channels.

* * * * *